US006625888B2

(12) United States Patent  
Heck et al.

(10) Patent No.: US 6,625,888 B2
(45) Date of Patent: Sep. 30, 2003

(54) PRUNING DEVICE (75) Inventors: Edward Heck, Belpre, OH (US); Michael McBride, Davisville, WV (US); Bryan Ritchie, Davisville, WV (US)

(73) Assignee: Ames True Temper, Inc., Camp Hill, PA (US)

( * ) Notice: Subject to any disclaimer, the term of this patent is extended or adjusted under 35 U.S.C. 154(b) by 128 days.

(21) Appl. No.: 09/968,662

(22) Filed: Oct. 2, 2001

(65) Prior Publication Data

US 2003/0061715 A1 Apr. 3, 2003

(51) Int. Cl.[7] ............................................. B26B 17/00
(52) U.S. Cl. ....................... 30/186; 30/262; 30/236; 30/244; 30/336; 30/338; 30/341
(58) Field of Search ......................... 30/342, 341, 337, 30/336, 335, 329, 262, 261, 258, 260, 254, 244, 236, 235, 125, 270

(56) References Cited

U.S. PATENT DOCUMENTS

| 486,560 A | 11/1892 | Dinkel |
| RE11,534 E | 4/1896 | Effinger et al. |
| 2,544,197 A | * 3/1951 | Vosbikian et al. ............ 30/262 |
| 2,690,010 A | * 9/1954 | Keller .......................... 30/252 |
| 3,416,226 A | * 12/1968 | Pfaffenbach ................. 30/261 |
| 3,772,783 A | 11/1973 | Averitt |
| 3,775,846 A | * 12/1973 | Johnson ....................... 30/262 |
| 3,949,474 A | 4/1976 | Sandbrook et al. |
| 3,971,131 A | 7/1976 | Boyajian et al. |
| 4,079,514 A | * 3/1978 | Arlett .......................... 30/261 |
| 4,250,619 A | 2/1981 | Buerkert et al. |
| 4,258,472 A | * 3/1981 | Wallace et al. .............. 30/262 |
| 4,980,975 A | * 1/1991 | Hodson ....................... 30/262 |
| 5,197,194 A | 3/1993 | Sorensen et al. |
| 5,206,965 A | 5/1993 | Rowley |
| 5,355,585 A | 10/1994 | Tepic |
| 5,495,670 A | 3/1996 | Quinn |
| 5,507,096 A | 4/1996 | Gamba |
| D374,597 S | 10/1996 | Birkholz et al. |
| 5,758,422 A | 6/1998 | Frank |
| D427,036 S | 6/2000 | Ronan |
| 6,105,256 A | 8/2000 | Budrow |

* cited by examiner

Primary Examiner—Boyer D. Ashley
(74) Attorney, Agent, or Firm—Eckert Seamans Cherin & Mellott, LLC (57) ABSTRACT

A pruning device includes a blade mounting jaw and an opposing jaw. A blade is removably mounted on a blade mounting portion of the blade mounting jaw to cut vegetation positioned between the jaws as the jaws are closed. A blade retainer is movable between a blade retaining and blade releasing positions with respect to the blade mounting portion and has a forward blade engaging portion. In its blade retaining position, the blade retainer secures the blade to the blade mounting portion. A forward edge portion of the blade is received between the forward blade engaging portion and the blade mounting portion. A rearward blade engaging structure and the blade mounting portion support a rearward portion of the blade. In its releasing position, the blade retainer releases the blade for replacement. Grip portions are operatively connected to the jaws to open and close the jaws.

25 Claims, 7 Drawing Sheets

PRUNING DEVICE

FIELD OF THE INVENTION

The present invention is generally related to lawn and garden equipment and more particularly related to a replaceable blade pruning device for cutting vegetation such as plant stems and branches.

BACKGROUND

Hand operated pruners are used in landscaping, horticulture and related fields to cut stems and small branches of plants. Pruners include a pair of hand grip portions that are operatively connected to a pair of opposing jaws. The jaws are opened and closed by manually opening and closing the hand grip portions. Often, one of the jaws defines a cutting edge and the opposing jaw defines a support surface that supports branches or stems being cut by the edge-defining jaw as the jaws move toward one another. It is important in many applications that the cutting edge of the pruner be sharp. A sharp cutting edge severs a branch or stem without crushing it, thereby minimizes damage to the plant or shrub. A sharp cutting blade also reduces the amount of hand pressure that must be applied to cut branches and stems, which is important to the operator, particularly when a large number of branches or stems have to be trimmed.

The cutting edge of some pruners is provided by replaceable blades. Standard replacement blades (of the type used in retractable blade utility knives, for example) are sharp, readily commercially available and relatively inexpensive. These standard blades are relatively thin, however, and tend to bend laterally or even break, particularly when cutting relatively large woody stems or branches. Thus, it would be desirable to provide a replaceable blade pruner that is better able to cut through relatively large or relatively woody stems without damaging the blade, or losing cutting efficiency due to bending of the blade.

Pruners also typically include locking assemblies which lock the jaws in their closed position. When the jaws are locked in their closed position, the cutting edge of one jaw is held very close to the support surface provided on the opposing jaw. Locking the jaws in their closed position therefore prevents accidental contact with the cutting edge of the pruner and thereby protects the cutting edge from damage.

Typically the grip portions of a pruner are biased by a spring or like mechanism into their open position. This biased grip and jaw movement is helpful to the worker when cutting a series of stems or branches because it allows the worker to open the jaws and the grip portions simply by releasing the grip portions. This spring biased opening action can be disadvantageous, however, when the pruners are not in use because the biasing force may cause the jaws to open accidentally, thereby exposing the pruner's cutting edge. Locking assemblies frequently release, for instance, when the pruner is subjected to a relatively high magnitude impact force as, for example, when the locked pruners are dropped on the ground or tossed into a tool box. When the locking assembly releases, the cutting edge is immediately exposed because of the bias force applied to the jaws of the pruner. Thus, it would be desirable to provide an improved pruner locking assembly that is more likely to remain in its locked position even when the pruner is subjected to an impact force to prevent the cutting edge of the blade from accidentally being exposed.

SUMMARY OF THE INVENTION

The invention provides a pruning device for pruning and trimming vegetation that includes a pair of jaws movable relative to one another between open and closed positions. At least one of the jaws is a blade mounting jaw having a blade mounting portion. A relatively thin replaceable blade having a cutting edge is removably mounted on the blade mounting portion of the device such that the cutting edge cuts into vegetation positioned between the jaws as the jaws are moving toward and into their closed position. The device further includes a blade retainer that is movable between a blade retaining position and a blade releasing position with respect to the blade mounting portion. The blade retainer has a forward blade engaging portion. The blade retainer is constructed such that (a) in the blade retaining position thereof, the blade retainer secures the blade to the blade mounting portion with a forward edge portion of the blade adjacent the cutting edge being received between the forward blade engaging portion and the blade mounting portion, and (b) in the blade releasing position thereof, the blade retainer releases the blade to allow removal and replacement of the blade. The device also includes a rearward blade engaging structure that is constructed and arranged such that, when the blade is secured to the blade mounting portion by the blade retainer, a rearward edge portion of the blade adjacent the cutting edge is received between the rearward blade engaging structure and the blade mounting portion. The forward blade engaging portion and the rearward blade engaging structure thereby cooperate with the blade mounting portion to restrict lateral movement of the cutting edge of the blade when the blade is cutting vegetation. A pair of hand grip portions that are movable relative to one another are operatively connected to the jaws such that moving the hand grip portions relatively toward one another moves the jaws toward and into the closed jaw position thereof and moving the hand grip portions relatively away from one another moves the jaws toward and into the open jaw position thereof.

The invention also provides a pruning device for pruning and trimming vegetation comprising a pair of pruner members, each pruner member having a jaw portion and a handgrip portion. The pruner members are movably mounted to one another such that movement of the handgrip portions towards one another moves the jaws relative to one another to closed jaw positions and movement of the handgrip portions away from one another moves the jaws relative to one another to open jaw positions. At least one of the jaws provides a cutting edge operable in cooperation with the other jaw to cut into vegetation positioned between the jaws. The pruning device also includes a biasing structure that exerts a biasing force on the pruner members. The biasing force tends to move the grip portions away from one another and the jaws into the open jaw positions thereof. The pruning device further includes a lock structure operatively mounted on one of the pruner members and movable (a) in a releasing direction to a releasing position wherein the handgrip portions are released for movement from one another to move the jaws to the open jaw positions and (b) in a locking direction to a locking position wherein the lock structure engages a locking surface on the other pruner member to lock the handgrip portions together to maintain the jaws in their closed jaw positions.

The lock structure and the locking surface of the other pruner member are configured with respect to one another such that, when the handgrip portions are moved together to move the jaws into the closed jaw positions thereof and the lock structure is in the locking position thereof the biasing force of the biasing structure tends to move the handgrip portions away from one another thereby causing the locking surface to urge the lock structure in the locking direction to urge the lock structure to remain in the locking position thereof.

Other aspects, features, and advantages of the present invention will become apparent from the following detailed description, the accompanying drawings, and the appended claims.

DETAILED DESCRIPTION

FIGS. 1–3, 10 and 11 show an example pruning device 10 constructed according to the principles of present invention for pruning and trimming vegetation. The pruning device 10 includes a pair of jaws 12, 14 movable relative to one another between an open position (see FIG. 10, for example) and a closed position (see FIG. 11, for example). The jaw 12 is a blade mounting jaw that includes a blade mounting portion 16 for mounting a relatively thin replaceable blade 18 having a sharp cutting edge 20. The blade 18 is removably mounted on the blade mounting portion 16 such that the cutting edge 20 cuts into vegetation (not shown) positioned between the jaws 12, 14 as the jaws are moving toward and into their closed position. The jaw 14 in the example device 10 is an anvil-type jaw having an anvil portion 22 that defines a support surface 24 that supports a branch, stem or like plant part during a cutting operation. The cutting edge 20 of the blade 18 engages the support surface 24 when the jaws 12, 14 are closed.

The pruning device 10 includes a pair of hand grip portions 26, 28 movable relative to one another and operatively connected to the jaws 12, 14 such that moving the hand grip portions 26, 28 toward one another and into their close grip position moves the jaws 12, 14 toward one another and into their closed jaw position and such that moving the hand grip portions 26, 28 away from one another and into their open grip position moves the jaws 12, 14 away from one another and into their open jaw position.

The example pruning device 10 includes a pair of pruner members 30, 32 pivotally mounted to one another by a threaded fastener 33 and bolt 34. The construction of the pruning device 10, including the pruner members 30, 32, is best understood from the partially exploded view of FIG. 4. Each pruner member 30, 32 is an integral member that may be constructed of a molded plastic (as shown) of suitable strength, a metal or other appropriate material. When the members are made of a molded plastic, each member may be made by injection molding, for example. The member 30 defines the jaw portion 14 at one end and the grip portion 26 at the opposite end. The jaw portion 14 includes a pair of laterally spaced wall portions 41, 43 extend rearwardly to the grip portion 26 and define an opening 45 to receive the member 32 therethrough. The wall portions 41, 43 include a pair of transversely aligned pivot openings 50, 52. The member 32 defines the jaw portion 12, the grip portion 28 and a pivot opening 54. The members 30, 32 are pivotally mounted together by placing member 32 through opening 45 in member 30 so that openings 50, 52, 54 are aligned. The fastener 33 is placed through the aligned openings 50, 52, 54 and held in position by bolt 34.

Figure 10:
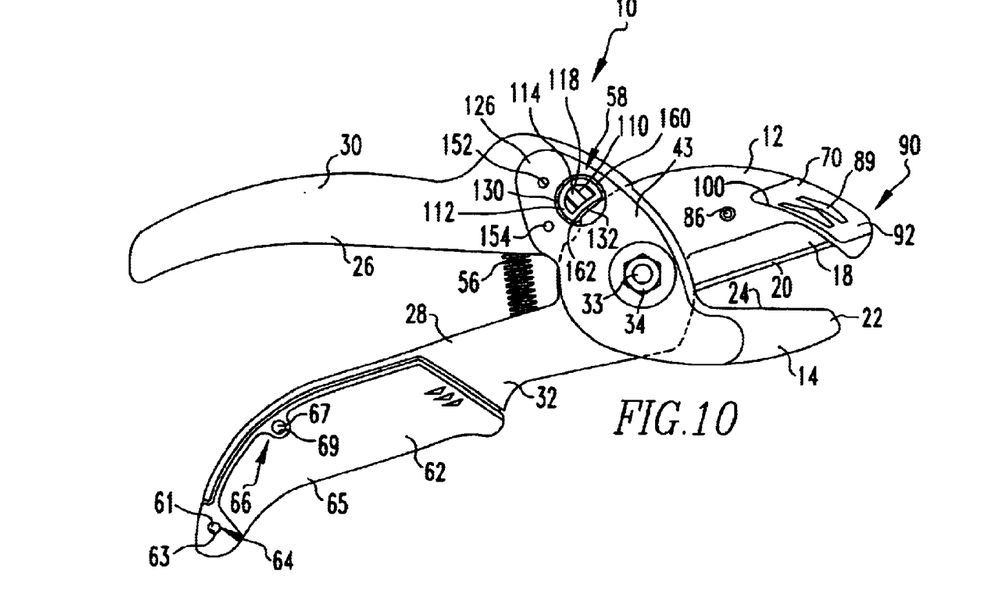
FIG. 10 shows a side elevational view of the pruning device in an open position thereof and shows a locking assembly of the pruning device in cross sectional view in a releasing position thereof.
Figure 11:
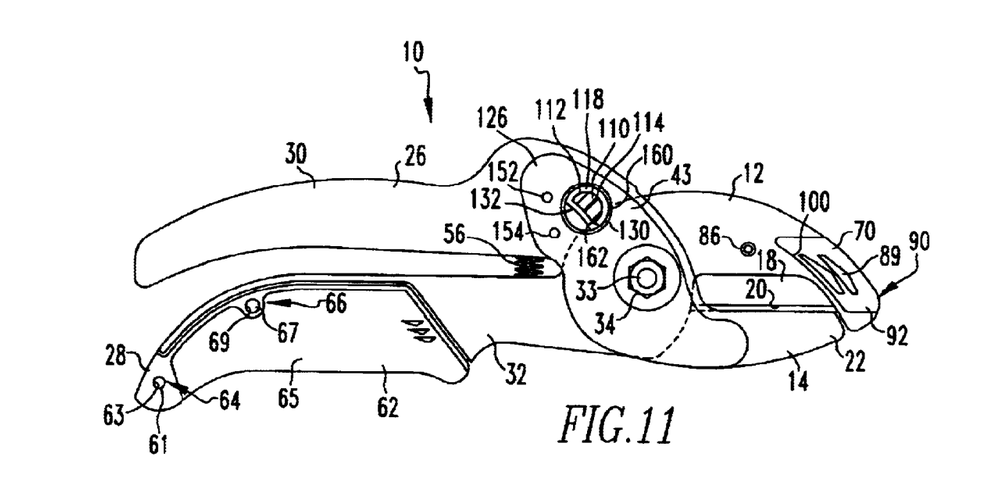
FIG. 11 shows a side elevational view of the pruning device in a closed position thereof and shows the locking assembly of the pruning device in cross sectional view in a locking position thereof.

The pruning device 10 further includes a biasing assembly in the form of a coil spring 56 that is mounted between the grip portions 26, 28 for biasing the hand grip portions away from one another into their open grip position (see FIG. 10, for example). As explained below, the pruning device 10 includes a locking assembly 58 for retaining the hand grip portions 26, 28 and the jaws 12, 14 substantially closed.

Figure 9:
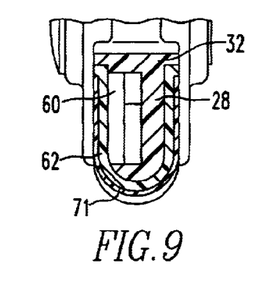
FIG. 9 shows a cross sectional view of the pruning device taken through the line 9—9 of FIG. 2.

The grip portion 28 includes a compartment 60 (shown in the cross sectional view of FIG. 9) for storing extra replaceable blades (not shown in FIG. 9) and a cover 62 for closing the compartment 60. The cover 62 is pivotally mounted to the grip portion 20 at 64 for movement between open (not shown) and closed cover positions and is releasably locked in its closed position with respect to the grip portion 28 by a locking arrangement generally indicated at 66. The pivotal connection 64 is provided by projections 61 extending outwardly from opposite sides of the member 32 and openings 63 on opposite side of the cover 62. The projections 61 are received in the openings 63 for movement with respect thereto when the cover is opened and closed.

The locking arrangement is of the detent-type and is comprised of a projection 67 integrally molded on the plastic of the member 32 and a recess 69 formed in the cover 62. In the example pruning device 10, the cover 62 is constructed of a plastic material and the cover 62 snap fits into its closed and locked position with respect to the grip portion 28 of the member 32. Although the cover 62 of the example pruner is constructed of a molded plastic, it can be understood that any suitable material can be used in its construction, including a suitable metal material or composite material. When the cover 62 is made of molded plastic, the cover 62 may be made by injection molding. The outer surface of the cover 62 in its closed position forms a portion of the gripping surface of the grip portion 28 that receives and supports the fingers of the worker's hand. The outer surface of the cover 62 is covered by a relatively soft rubber-like or elastomeric material 65 which provides a cushioned gripping surface for the worker's hand.

The blade 18 is removably mounted on the jaw 12 by a blade retainer 70. The blade retainer 70 is movable between a blade retaining position (see FIG. 10, for example) and a blade releasing position (see FIG. 5, for example) with respect to the blade mounting portion 16 of the jaw 12. In its blade releasing position, the blade retainer 70 is removed from the blade mounting portion 16 of the jaw 12. When the blade retainer 70 is in its releasing position, an old blade can be removed from the jaw 12 and replaced with a new blade. The blade retainer 70 is then returned to its blade retaining position to hold the blade 18 on the jaw 12.

The blade retainer 70 has a forward blade engaging portion 72. The blade retainer 70 is constructed such that when the blade retainer 70 is in its blade retaining position, a forward edge portion 71 (see FIGS. 4 and 5, for example) of the blade 18 is secured between the forward blade engaging portion 72 and the blade mounting portion 16. Although in the illustrated embodiment the entire length of the forward edge portion 71 is secured between portion 72 and the blade mounting portion 16, the device 10 may be constructed such that only a part of the forward edge portion 71 is secured therebetween. It is important that at least the part of the forward edge portion 71 at or adjacent the cutting edge 20 be secured by the forward blade engaging portion 72 to reduce lateral flexing of the cutting edge 20.

Figure 7:
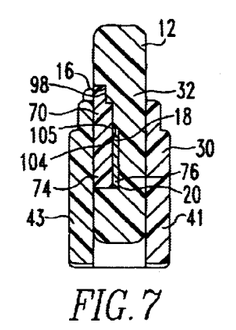
FIG. 7 shows a cross sectional view of the pruning device taken through the line 7—7 of FIG. 2.
Figure 12:
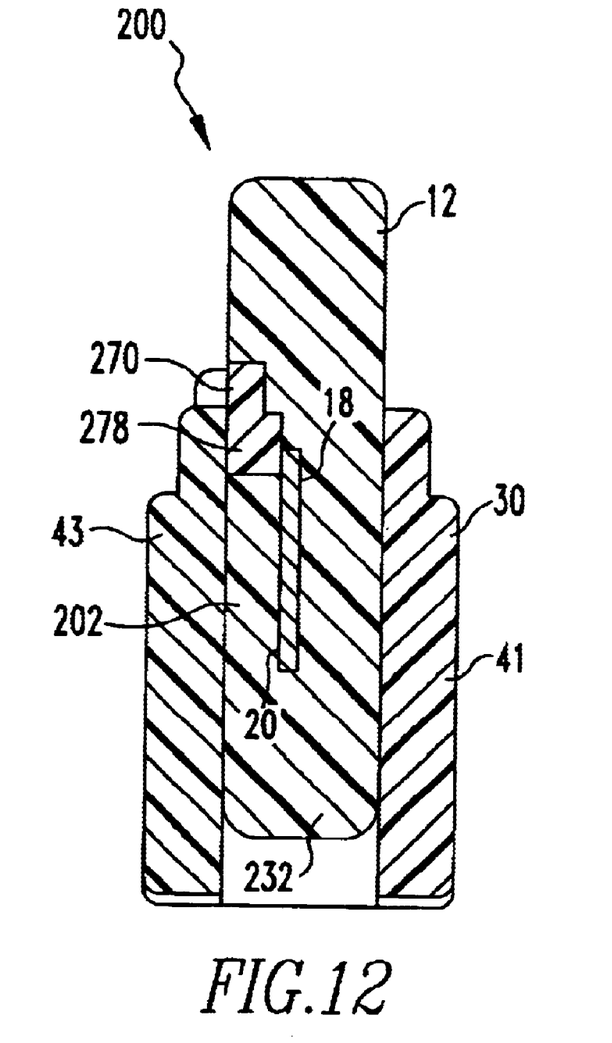
FIG. 12 shows a view similar the view of FIG. 7 of an alternative embodiment of the pruning device.

The pruning device 10 further includes a rearward blade engaging structure which in the example device 10 is provided by a rearward blade engaging portion 74 of the blade retainer 70. When the blade 18 is secured in the blade mounting portion 16 by the blade retainer 70, a rearward edge portion 76 of the blade is secured between the rearward blade engaging portion 74 of the blade retainer 70 and the blade mounting portion 16 of the jaw 12 (best seen in FIG. 7). Although in the illustrated embodiment of the device 10 the entire length of the rearward edge portion 76 is secured between the rearward blade engaging portion 74 and the blade mounting portion 16, the device 10 may also be constructed such that only a part of the rearward edge portion 76 is secured therebetween. It is important that at least the part of the rearward edge portion 76 at or adjacent the cutting edge 20 be secured (as by the cooperation between the blade mounting portion 16 and the rearward blade engaging portion 74 as shown in the example device 10 or by some other structural threaded metal insert or nut 83 (see FIG. 8) may optionally be mounted in the arrangement, an example of which is illustrated in FIG. 12 and described below) to reduce lateral flexing of the cutting edge 20. Thus, the forward blade engaging portion 72 and the rearward blade engaging portion 74 cooperate with the blade mounting portion 16 to restrict flexing of a lower portion of the blade 18 and hence lateral movement of the cutting edge 20 when the blade 18 is cutting vegetation.

The blade retainer 70 has an upper blade engaging portion 78 (see FIGS. 5 and 8, for example) extending between the forward blade engaging portion 72 and the rearward blade engaging portion 76. In the example device 10, the blade retainer 70 is an integral molded plastic structure that is shaped to define the portions 72, 76 and 78, although any suitable material can be used including a metal material or a composite material. When molded plastic is used in the construction, the blade retainer may be made by injection molding.

Figure 8:
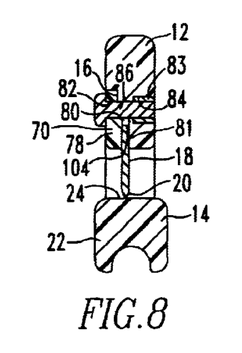
FIG. 8 shows a cross sectional view of the pruning device taken through the line 8—8 of FIG. 2.

When the blade retainer 70 is in its blade retaining position, an upper edge portion 81 of the blade 18 is held between the upper blade engaging portion 78 and the blade mounting portion 16 (see FIG. 8, for example). This support arrangement for the blade 18 (using the portions 72, 76, 78 of the blade retainer 70 on one side of the blade 18 and respective opposing portions of the blade mounting portion 16 of the jaw 12 on the opposite side of the blade 18) rigidifies the blade 18 by providing support structure on each end 71, 76 of the blade 18 at (or very near to) the cutting edge 20 of the blade 18 and upwardly therefrom along the top edge 81 (that is, the edge opposite the cutting edge 20) of the blade 18. This blade support arrangement leaves the central portion of the blade 18 (including most of the length of the cutting edge 20) exposed so that the central portion of the blade 18 can be used to cut relatively large, woody stems and branches without bending or breaking.

Figure 5:
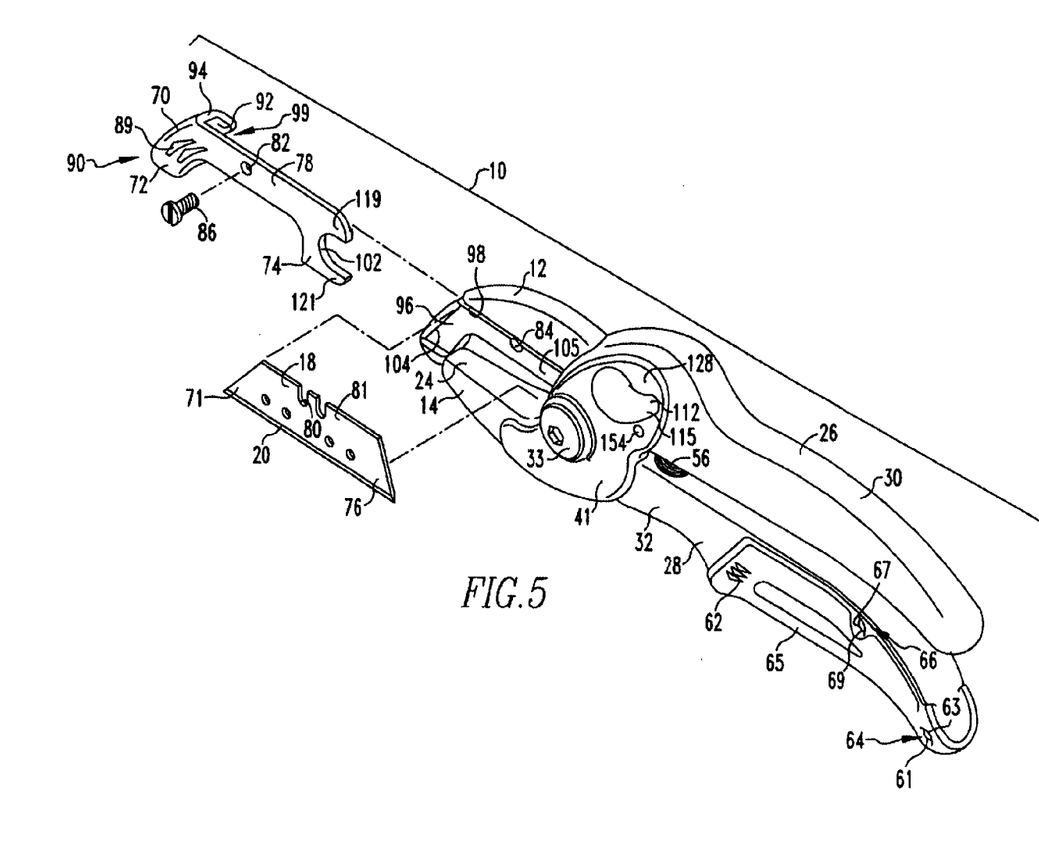
FIG. 5 shows a blade retainer, a threaded fastener and a replaceable blade in exploded relation with the assembled pruning device.

The upper edge portion of the blade 18, the upper blade engaging portion 78 of the blade retainer 70 and the blade mounting portion 16 each have fastener receiving openings 80, 82, 84, respectively, to receive a blade retaining fastener in the form of a threaded fastener 86 inserted through the fastener receiving openings 80, 82, 84 to secure blade retainer 70 in its blade retaining position (best appreciated from FIGS. 5 and 8). The fastener receiving opening 80 on the upper edge portion of the blade 18 is provided by a notch. A threaded metal insert or nut 83 (see FIG. 8) may optionally be mounted in the opening 84 of the blade mounting portion 16 of the member 32 to threadedly engage the threads of the fastener 86.

The blade retainer 70 is slidably mounted on the blade mounting jaw 12. The blade retainer 70 slides rearwardly into its blade retaining position on the mounting portion 16 and forwardly out of engagement with the jaw 12 for removal of the blade 18 from the mounting portion 16. The blade retainer 72 includes integral gripping structures 89 that aid the worker in grasping the retainer 72 to facilitate removal of the retainer from the mounting portion 16. The blade retainer 70 has a forward nose portion 90 which includes the forward blade engaging portion 72 and an opposing wall portion 92 laterally spaced from and connected to the forward blade engaging portion 72 by a relatively short laterally extending wall portion 94 (see FIG. 5, for example). The forward blade engaging portion 72, the opposing wall portion 92 and wall portion 94 define a space or slot-like structure 99 therebetween that slides over a forward edge portion 96 (see FIG. 5, for example) of the blade mounting jaw 12. Engagement of the opposing wall portion 92 with the forward edge portion 96 of the blade mounting jaw 12 inhibits lateral movement of the forward blade engaging portion 72 away from the blade mounting portion 16. This engagement stabilizes and rigidifies the blade 18 and thereby prevents lateral movement of the blade 18 during a cutting operation. The rearward blade engaging portion 74 of the blade retainer 70 is received between the jaws 12, 14 when the blade retainer 70 is in its blade retaining position (see FIG. 7, for example).

More specifically, each side of the blade mounting jaw 12 includes a recess 98, 100, respectively, (best understood from FIGS. 4, 7, and 10) that is shaped to receive blade retainer 70. The main portion of the blade retainer 71 is received in the recess 98, while the opposing wall portion 92 is received in the recess 100 on the opposite side of the jaw 12.

Figure 1:
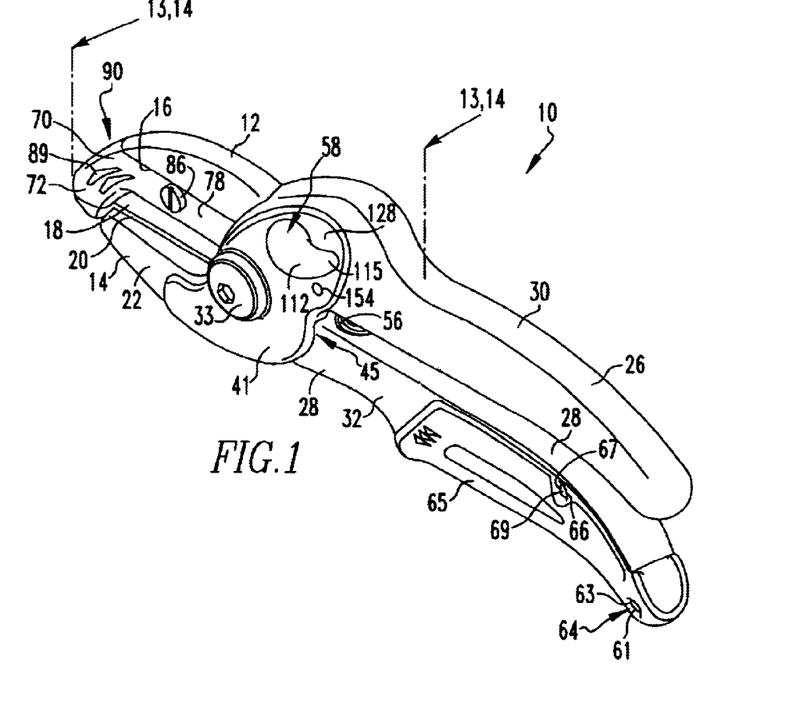
FIG. 1 shows a perspective view of a pruning device constructed according to the principles of present invention.
Figure 2:
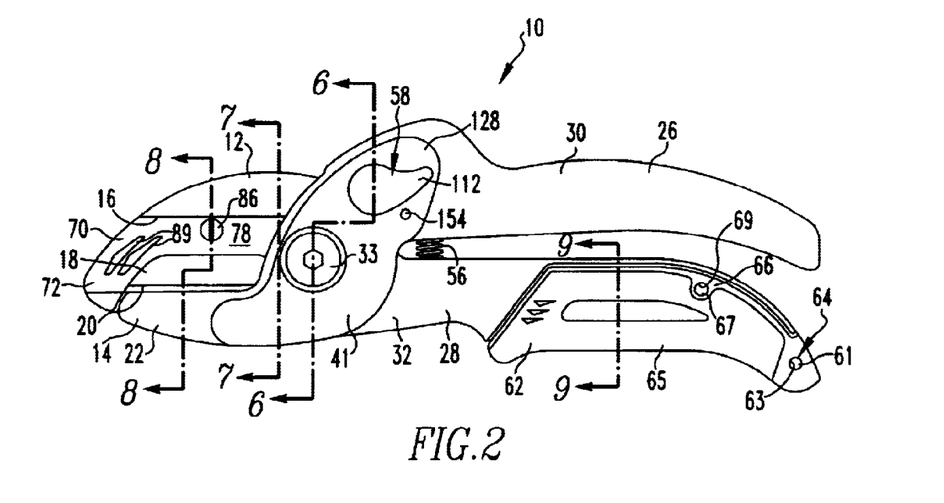
FIG. 2 shows a side elevational view of the pruning device.
Figure 3:
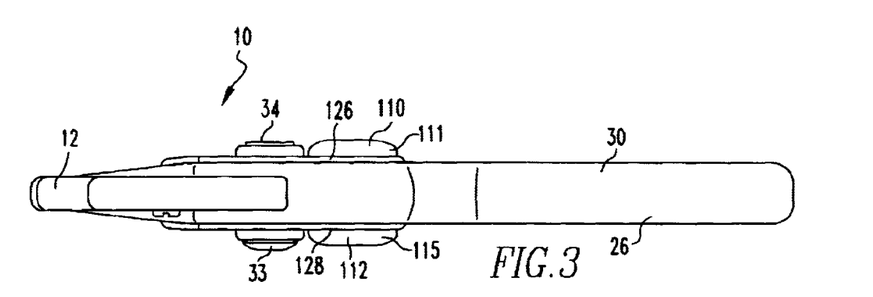
FIG. 3 shows a top plan view of the pruning device.
Figure 4:
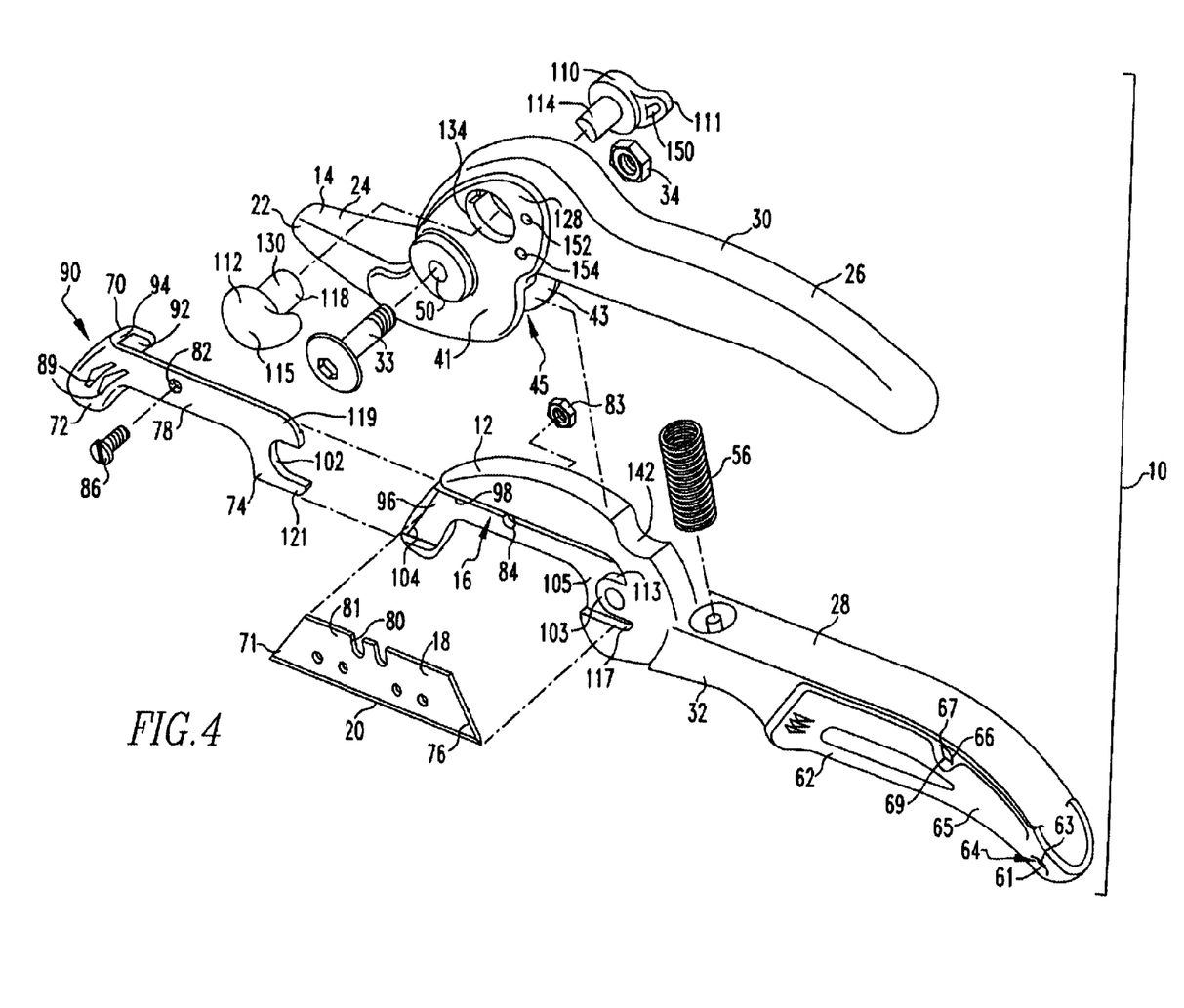
FIG. 4 shows a partially exploded view of the pruning device.
Figure 6:
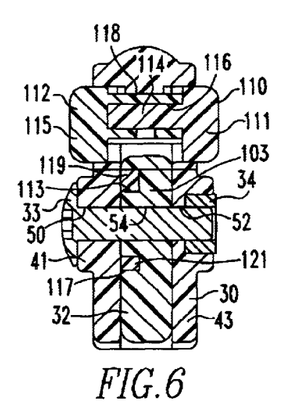
FIG. 6 shows a cross sectional view of the pruning device taken through the line 6—6 of FIG. 2.

The blade retainer 70 also has a slot or notch 102 at its rearward edge for accommodating the jaw fastener 33 (and the structure 103, best seen in FIGS. 4 and 6, surrounding the fastener 33). The recess terminates in a pair of slots 113, 117 on opposing sides of the fastener 33 and the structure 103. The projections 119, 121 on opposing sides of the notch 102 are received within the slots 113, 117 (see FIG. 4, for example). When the blade retainer 70 is in its blade retaining position, the rearward blade engaging portion 74 is positioned between a wall portion 105 which is a part of the mounting portion 16 on the jaw 12, and the wall portion 41 of the jaw 14 (as best understood from FIGS. 6 and 7). This positioning of the rearward blade engaging portion 74 between the members 30, 32 prevents lateral movement of the rearward blade engaging portion 74 away from the blade mounting portion, thereby assuring that the rearward portion 76 of the blade 18 is securely supported during a cutting operation.

Operation

To place a new blade 18 in the device 10, the worker removes the threaded fastener 86 and slides the blade retainer 70 forwardly out of engagement with the blade mounting portion 16 of the jaw 12. This operation is best understood from FIG. 5 which shows the blade 18, the blade retainer 70 and the threaded fastener 86 in exploded relation with the assembled pruning device. The jaws 12, 14 may optionally be moved into their open position to facilitate placement of a new blade 18 in the mounting portion 16 of the jaw 12. The mounting portion 16 of the jaw 12 includes a recess 104 that is shaped to receive the blade 18. After a new blade 18 is placed in the recess 104, the blade retainer 70 is placed on the mounting portion 16 of the jaw 12 and the threaded fastener 86 is secured in the openings 80, 82, 84 to hold the blade retainer 70 and the blade 18 on the jaw 12.

The worker then allows the coil spring 56 to move the grip portions 26, 28 to their open positions, thereby opening the jaws 12, 14, and positions a branch or stem to be severed between the jaws 12, 14. The worker squeezes the grip portions 26, 28 toward one another to move the same into their closed position, thereby causing the jaws to move toward and into their closed position and the cutting edge 20 of the blade 18 to sever the branch or stem that is supported by the support surface 24 of the device 10. After the branch or stem is cut, the worker releases the pressure on the gripping portions 26, 28 to allow the coil spring 56 to return to jaws 12, 14 to their open position to receive another branch or stem.

The jaws 12, 14 can be releasably locked substantially in their closed positions using the locking assembly 58. The structure and operation of the locking assembly 58 can be best understood from FIGS. 4, 6, 10, and 11. The locking assembly 58 includes a pair of lock members 110, 112 that may be of molded plastic construction as shown, although any suitable material (or materials), including any appropriate metal, may be used in their construction. The lock member 110 includes a manually engagable portion 111 and an inwardly extending structure 114 integrally formed therewith. The lock member 112 includes a manually engagable portion 115 and an inwardly extending lock structure 118. The inwardly extending lock structure 118 has a central recess 116 (see FIG. 6) and an exterior surface. The exterior surface of the inwardly extending structure 118 includes a convex camming wall surface portion 130 and a concave wall surface portion 132 (see FIGS. 10 and 11, for example).

The locking members 110, 112 are mounted in the pruner member 30 in a manner shown, for example, in FIG. 6. It can be appreciated from a comparison of FIGS. 13 and 14, for example, that the lock structure 118 is operatively mounted on pruner member 30 and is movable (a) in a releasing direction to a releasing position (FIG. 13, for example) wherein the handgrip portions 26, 28 are released for movement from one another to move the jaws 12, 14 to the open jaw positions and (b) in a locking direction to a locking position (see FIG. 14, for example) wherein the lock structure 118 engages a locking surface 162 on the other pruner member 32 to lock the handgrip portions together to maintain the jaws in their closed jaw positions.

More specifically, the pruner member 30 has a laterally extending opening 134 that is constructed and arranged to receive the inwardly extending lock structure 118 of the lock member 112 for pivotal movement (as shown) or, alternatively, rotational movement locking and releasing positions. The locking members 110, 112 are press fit into engagement with one another by pressing the inwardly extending structure 114 (see FIGS. 4 and 6) on the lock member 110 into the recess 116 (see FIG. 6) on the locking member 112. The structure 114 is held within the recess 116 by an interference fit in the example device 10, although a snap fit construction, an adhesive or any other suitable construction could be used. When the locking members 110, 112 are interengaged, the manually engagable portions 111, 115 thereof are adjacent respective sides surfaces 126, 128 of the pruner members 30, 32, respectively.

Figure 13:
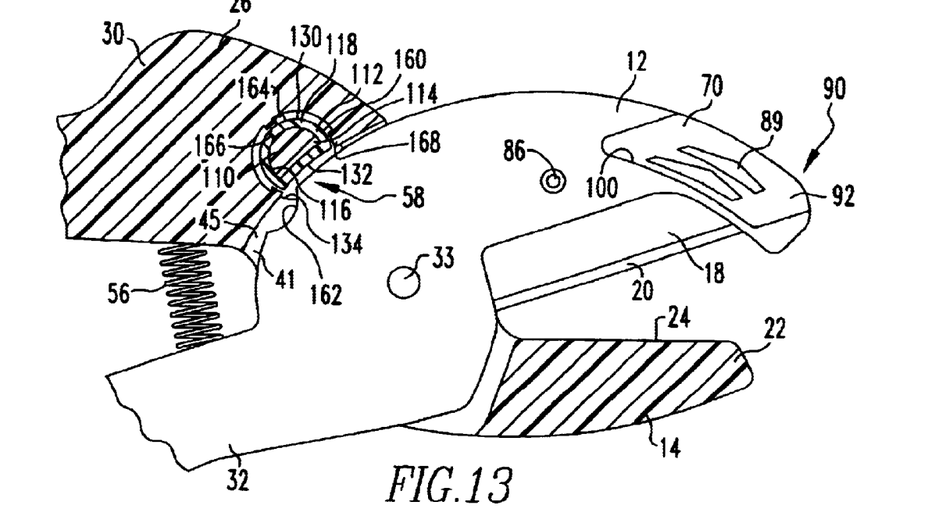
FIGS. 13 and 14 are cross sectional views of a portion the pruning device taken through the line 13, 14 in FIG. 1, FIG. 13 showing the pruning device in its open position and the locking assembly thereof in its releasing position and FIG. 14 showing the pruning device in its open position and the locking assembly thereof in its locking position.
Figure 14:
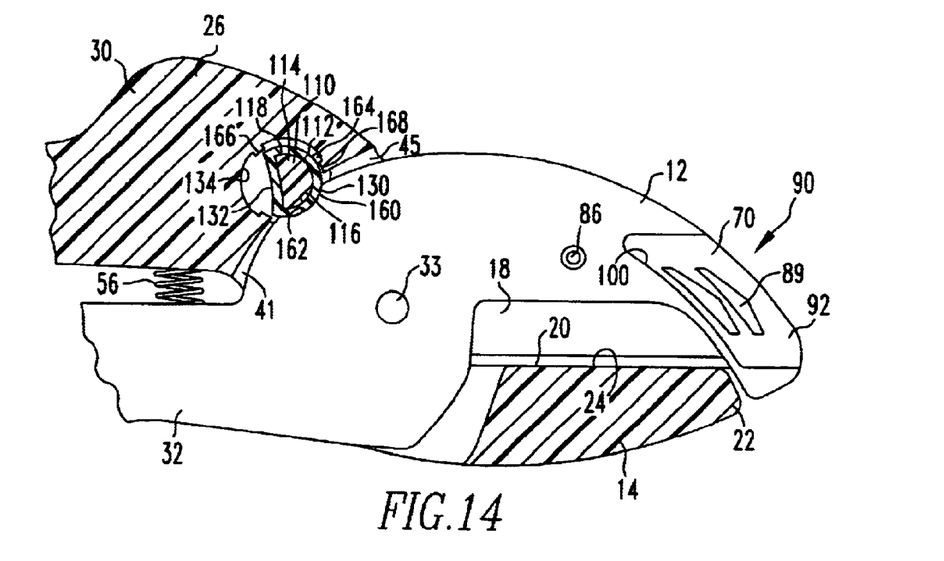

Part of the opening 134 extends through a forward portion of the grip portion 26 and part of the opening 134 extends through the laterally spaced walls 41, 43 (see FIG. 13, for example, although FIG. 13 shows only wall 41 and not wall 43). When the locking members 110, 112 are in their releasing position (FIG. 13, for example), the convex wall portion 132 of the inwardly extending structure 118 faces outwardly toward the opening 45 in the pruner member 30. When the convex wall portion 132 is in this position, the jaw 12 is able to move between its open and closed positions with respect to the jaw 14. When the handgrip portions 26, 28 are closed, an arcuate recess 142 on a back surface of the jaw portion 12 of pruner member 32 is positioned to allow movement of the locking assembly 58 from its releasing position into its locking position. Movement of the locking assembly 58 into its locking position causes a portion of the lock structure 118 of the locking member 112 to pivot into the opening 45 and into the recess 142 of the pruner member 32. When the grip portions 26, 28 are released, the biasing force of the biasing structure 56 causes the pruner members 30, 32 to pivot about the bolt 33 in an opening direction which causes the arcuate wall surface 162 of the recess 142 to move into contact with the concave wall surface 132 of the lock structure 118 of the locking member 112. The convex wall portion 132 is shaped to provide a locking camming surface 160 and the recess 142 is shaped to provide a locking surface 162.

The lock structure 118 of the locking assembly 58 and the locking surface 162 of the pruner member 32 are configured with respect to one another such that, when the handgrip portions 26, 28 are moved together to move the jaws 12, 14 into the closed jaw positions thereof and the lock structure 118 is in its locking position, the biasing force of the biasing structure 56 tends to move the handgrip portions 26, 28 away from one another, thereby causing the locking surface 162 to urge the lock structure 118 in the locking direction to urge the lock structure 118 to remain in the locking position thereof.

The locking surface 162 is a camming surface in the example pruning device 10. The camming surfaces 160, 162 are constructed and arranged such that when the lock structure 118 is in its locking position and the biasing force of the biasing structure 56 is tending to move the handgrip portions away from one another as aforesaid, the biasing force biases the camming surfaces 160, 162 against one another. The camming surfaces 160, 162 are shaped such that when they are biased against one another, the lock structure 118 tends to move toward and into its locking position. This camming arrangement is advantageous in many situations. For example, if the pruner device 10 is dropped or if one of the manually engagable portions 111, 115 is accidentally struck while the pruner device 10 is locked, the camming engagement between the surfaces 160, 162 reduces the likelihood that the locking assembly 58 will move into its releasing position.

Thus, the locking assembly 58 is constructed and arranged such that when the locking assembly 58 is in its releasing position, the hand grip portions 26, 28 are movable between their open and closed grip positions and such that when the locking assembly 58 is in its locking position, the hand grip portions 26, 28 are substantially closed and are prevented from moving toward their open grip position, thereby preventing the pair of jaws 12, 14 from moving toward their open jaw position. The locking assembly 58 is operatively engaged with the pruner members 30, 32 such that when the hand grip portions 26, 28 are held in their closed grip position against the biasing force of the spring 56, the locking assembly 58 can be moved manually into its locking position and such that when the hand grip portions 26, 28 are released from their closed grip position while the locking assembly 58 is in its locking position, the biasing force exerted by the biasing assembly 56 on the pruner members 30, 32 causes the pruner members 30, 32 to exert a force on the locking assembly 58 which tends to move the assembly 58 toward and into its locking position.

When the locking assembly 58 is in its locking position and the jaws are substantially closed, the blade retainer 16 is movable from its blade retaining position into its blade releasing position to allow replacement of an old blade with a new blade. The blade retainer 16 is movable from its blade releasing position to its blade retaining position to retain the new blade in the blade mounting portion while the jaws are lock in their closed positions. Thus, the blade can be replaced with the jaws in their closed position.

A recess 150 (see FIG. 4) is formed on the inwardly facing side of each manually engagable portion 111, 115 of the locking assembly 58 (the inwardly facing side of the portion 115 is not visible in the drawings). A pair of the projections 152, 154 are formed on each side surface 126, 128 of the pruner member 30. When the locking assembly 58 is pivoted between its locking and releasing positions, the projections 152, 154 are received in the recess 150 of each manually engagable portion 111, 115 to releasably hold the locking assembly 58 in its locking position and releasing position. The locking assembly 58 also includes a motion limiting structure in the form of an integral flange structure 164 on the latch member 112 and flange structures 166, 168 integrally formed on the inner surface of the opening 134 (see FIGS. 13 and 14). The flange structures 164 and 166 limit the pivotal movement of the locking assembly 58 in its releasing direction and flange structures 164 and 168 limit motion of the locking assembly 58 in its locking direction. More specifically, when the locking assembly 58 is released, abutting engagement between the flange structures 164, 166 stops the locking assembly 58 in its releasing position and when the locking assembly 58 is locked, abutting engagement between the flange structures 164, 168 stops the locking assembly 58 in its locking position.

It can be understood that the description of the example pruner device 10 is intended to illustrate the principles of the invention only and this description is not intended to limit the scope of the invention to the embodiment shown and described. Other variations are contemplated. For example, although the rearward blade engaging structure in the example of pruner device 10 was provided by the rearward blade engaging portion 74 of the blade retainer 70, other constructions are possible. For example, FIG. 12 shows another example of a pruner device 200 in cross-section. The cross-section of pruner device 200 in FIG. 12 is similar to the cross-section of pruner device 10 in FIG. 7. Portions of the pruner device 200 that are identical to portions of the pruner device 10 are indicated by the same reference numbers and are not commented upon further. In the pruner device 200, the rearward blade engaging structure is provided by a wall portion 202 integrally formed as part of the pruner member 232. The upper portion of the blade 18 is held within the blade mounting portion of the pruner device by an upper portion 278 of the blade retainer 270 of the pruner device 200. As another alternative, the pruner member 30 could be constructed so that rearward blade engaging structure is provided by a portion of the pruner member 30.

It is also within the scope of the present invention to provide a replaceable blade on one or both jaws of a bypass-type pruner (that is, a pruning device having a cutting edge or cutting blade on each jaw that bypass one another when the jaws are opened and closed).

Thus, while the invention has been disclosed and described with reference with a single exemplary embodiment, it will be apparent that variations and modifications may be made thereto without departing from the spirit and scope of the invention. Therefore, the following claims are intended to cover all such modifications, variations, and equivalents thereof in accordance with the principles and advantages noted herein.

What is claimed:

1. A pruning device for pruning and trimming vegetation, said pruning device comprising:

a pair of jaws movable relative to one another between open and closed positions, at least one of said jaws being a blade mounting jaw having a blade mounting portion;

a relatively thin replaceable blade having a cutting edge, said blade being removably mounted on said blade mounting portion such that said cutting edge cuts into vegetation positioned between said jaws as said jaws are moving toward and into said closed position thereof;

a blade retainer movable between a blade retaining position and a blade releasing position with respect to said blade mounting portion, said blade retainer having a forward blade engaging portion, said blade retainer being constructed such that (a) in said blade retaining position thereof said blade retainer secures said blade to said blade mounting portion with a forward edge portion of said blade adjacent said cutting edge being received between said forward blade engaging portion and said blade mounting portion, and (b) in said blade releasing position thereof said blade retainer releases said blade to allow for removal and replacement thereof;

rearward blade engaging structure constructed and arranged such that, when said blade is secured to said blade mounting portion by said blade retainer, a rearward edge portion of said blade adjacent said cutting edge is received between said rearward blade engaging structure and said blade mounting portion, said forward blade engaging portion and said rearward blade engaging structure thereby cooperating with said blade mounting portion to restrict lateral movement of said cutting edge when said blade is cutting vegetation; and a pair of hand grip portions movable relative to one another and operatively connected to said jaws such that moving said hand grip portions relatively toward one another moves said jaws toward and into said closed position thereof and moving said hand grip portions relatively away from one another moves said jaws toward and into said open position thereof.

2. A pruner according to claim 1, wherein said blade retainer in said blade releasing position thereof is removed and separated from said blade mounting jaw.

3. A pruning device according to claim 1, wherein one of said hand grip portions has a compartment for storing extra replaceable blades and a cover for closing said compartment.

4. A pruning device according to claim 1, wherein said blade mounting jaw is the only blade mounting jaw and wherein the other jaw is an anvil jaw having an anvil portion against which the cutting edge of said blade engages.

5. A pruning device according to claim 1, wherein said jaws are fixed with said hand grip portions and pivotally interconnected together.

6. A pruning device according to claim 5, further comprising a spring for biasing said hand grip portions apart from one another.

7. A pruning device according to claim 6, further comprising a lock for retaining said hand grip portions in said closed position thereof.

8. A pruning device according to claim 1, wherein said rearward blade engaging structure is provided by a rearward blade engaging portion of said blade retainer spaced rearwardly from said forward blade engaging portion, said blade retainer being constructed such that in said blade retaining position thereof said forward blade engaging portion engages a forward portion of the blade and said rearward blade engaging portion engages a rearward portion of said blade to restrict flexure of and lateral movement of said lower portion of said blade in cooperation with said blade mounting portion as aforesaid.

9. A pruning device according to claim 8, wherein said forward edge portion of said blade includes a forward portion of said cutting edge of said blade and wherein said rearward edge portion of said blade includes a rearward portion of said cutting edge of said blade.

10. A pruning device according to claim 8, wherein said blade retainer has an upper blade engaging portion extending between said forward blade engaging portion and said rearward blade engaging portion, said blade retainer being constructed such that in said blade retaining position thereof an upper edge portion of said blade is received between said upper blade engaging portion and said blade mounting portion.

11. A pruning device according to claim 10, wherein said upper edge portion of said blade, said upper blade engaging portion of said blade retainer and said blade mounting portion each have fastener receiving openings formed therethrough, said device further including a blade retaining fastener inserted through said fastener receiving openings to secure said blade retainer in said blade retaining position thereof.

12. A pruning device according to claim 11, wherein said blade retainer is slidably mounted to said blade mounting jaw such that said blade retainer slides rearwardly into said blade retaining position thereof to secure a blade in said mounting portion and forwardly to said blade releasing position thereof for removal of said blade from said mounting portion.

13. A pruning device according to claim 12, wherein said rearward blade engaging portion of said blade retainer is received laterally between said jaws when said blade retainer is in said blade retaining position thereof to thereby prevent lateral movement of said rearward blade engaging portion away from said blade mounting portion.

14. A pruning device according to claim 11, wherein the fastener receiving opening on the upper edge portion of said blade is provided by a notch.

15. A pruning device according to claim 14, wherein said blade retainer has a forward nose portion comprising said forward blade engaging portion and an opposing wall portion connected to said forward blade engaging portion, said forward blade engaging portion and said opposing wall defining a slot therebetween that slides over a forward edge portion of said blade mounting jaw in said blade retaining position of said retainer such that engagement of said opposing wall portion with said forward edge portion of said blade mounting jaw prevents lateral movement of said forward blade engaging portion away from said blade mounting portion.

16. A pruning device according to claim 15, wherein said jaws are pivotally connected to one another by a jaw fastener and wherein said blade retainer has a slot at the rearward edge thereof for accommodating said jaw fastener.

17. A pruning device for pruning and trimming vegetation, the pruning device comprising:

a pair of pruner members, each pruner member having a jaw portion and a handgrip portion, the pruner members being movably mounted to one another such that movement of the handgrip portions towards one another moves the jaws relative to one another to closed jaw positions and movement of the handgrip portions away from one another moves the jaws relative to one another to open jaw positions, at least one of the jaws providing a cutting edge operable in cooperation with the other jaw to cut into vegetation positioned between the jaws;

a biasing structure that exerts a biasing force on the pruner members which force tends to move the grip portions away from one another and the jaws into the open jaw positions thereof; and a lock structure operatively mounted on one of said pruner members and movable (a) in a releasing direction to a releasing position wherein the handgrip portions are released for movement from one another to move said jaws to the open jaw positions and (b) in a locking direction to a locking position wherein said lock structure engages a locking surface on the other pruner member to lock the handgrip portions together to maintain said jaws in said closed jaw positions;

said lock structure and said locking surface of the other pruner member being configured with respect to one another such that, when said handgrip portions are moved together to move said jaws into said closed jaw positions thereof and said lock structure is in said locking position thereof, the biasing force of the biasing structure tends to move the handgrip portions away from one another thereby causing said locking surface to urge said lock structure in the locking direction to urge said lock structure to remain in the locking position thereof.

18. A pruning device according to claim 17, wherein said lock structure includes a camming surface and wherein said locking surface on said other pruner member is a camming surface, the camming surfaces being constructed and arranged such that when the lock structure is in its locking position and the biasing force of said biasing structure is tending to move said handgrip portions away from one another as aforesaid, the biasing force biases the camming surfaces against one another, the camming surfaces being shaped such that when they are biased against one another, the lock structure tends to move toward and into its locking position as aforesaid.

19. A pruning device according to claim 17, wherein said lock structure is rotatably mounted on said one pruner member for movement between the releasing position and the locking position thereof as aforesaid.

20. A pruning device according to claim 17, wherein said lock structure is pivotally mounted on said one pruner member for movement between the releasing position and the locking position thereof as aforesaid.

21. A pruning device according to claim 17, wherein said at least one jaw is a blade mounting jaw having a blade mounting portion, the pruning device further comprising, a relatively thin replaceable blade removably mounted on said blade mounting portion, said blade having a cutting edge which provides the cutting edge of said at least one jaw;

a blade retainer movable between a blade retaining position and a blade releasing position with respect to said blade mounting portion, said blade retainer having a forward blade engaging portion, said blade retainer being constructed such that (a) in said blade retaining position thereof said blade retainer secures said blade to said blade mounting portion with a forward edge portion of said blade adjacent said cutting edge being received between said forward blade engaging portion and said blade mounting portion, and (b) in said blade releasing position thereof said blade retainer releases said blade to allow for removal of said blade from the blade mounting portion of said one jaw and for replacement of said blade; and rearward blade engaging structure constructed and arranged such that, when said blade is secured to said blade mounting portion by said blade retainer, a rearward edge portion of said blade adjacent said cutting edge is received between said rearward blade engaging structure and said blade mounting portion, said forward blade engaging portion and said rearward blade engaging structure thereby cooperating with said blade mounting portion to restrict lateral movement of said cutting edge when said blade is cutting vegetation.

22. A pruning device according to claim 21, wherein said blade mounting portion and said blade retainer are constructed and arranged such that when said lock structure is in the locking position thereof and the jaws are closed, said blade retainer is movable (a) from its blade retaining position into its blade releasing position to allow replacement of an old blade with a new blade and (b) from its blade releasing position to its blade retaining position to retain the new blade in the blade mounting portion.

23. A pruning device according to claim 21, wherein said rearward blade engaging structure is provided by a rearward blade engaging portion of said blade retainer.

24. A pruning device according to claim 21, wherein said rearward blade engaging structure is provided by structure on said one pruner member.

25. A pruning device according to claim 21, wherein said rearward blade engaging structure is provided by structure on the other of said pruner members.

* * * * *

UNITED STATES PATENT AND TRADEMARK OFFICE
CERTIFICATE OF CORRECTION

PATENT NO. : 6,625,888 B2
DATED : September 30, 2003
INVENTOR(S) : Edward Heck et al.

It is certified that error appears in the above-identified patent and that said Letters Patent is hereby corrected as shown below:

Column 5,
Lines 41 and 42, remove the words "threaded metal insert or nut 83 (see Fig. 8) may optionally be mounted in the".

Column 6,
Line 16, after "secure" insert -- the --.

Signed and Sealed this

Sixteenth Day of March, 2004

JON W. DUDAS
*Acting Director of the United States Patent and Trademark Office*